Nov. 27, 1934.  I. F. McDONALD  1,981,875
COOKING MACHINE
Filed Jan. 18, 1932   2 Sheets-Sheet 1
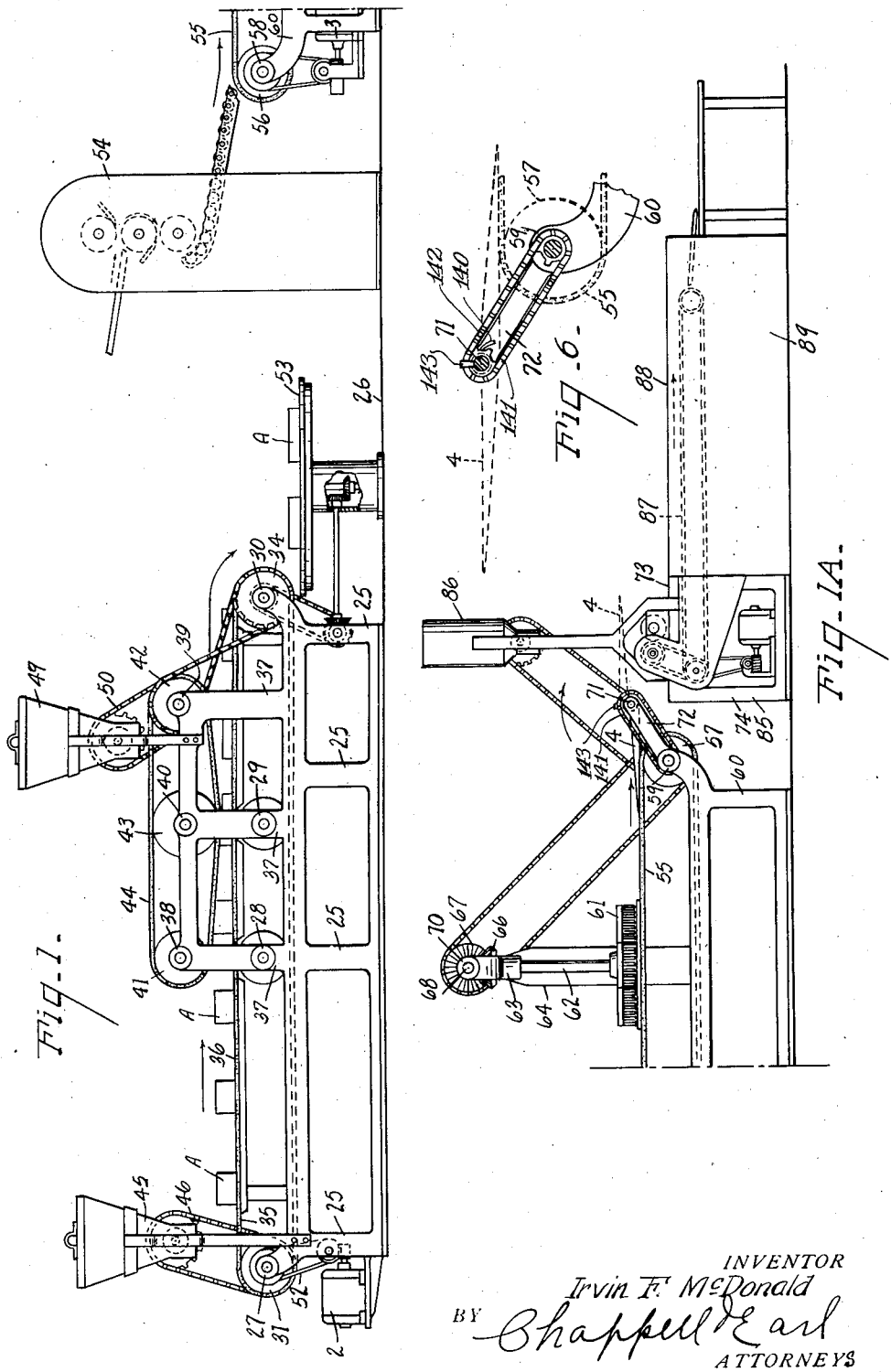
INVENTOR
Irvin F. McDonald
BY Chappell & Earl
ATTORNEYS

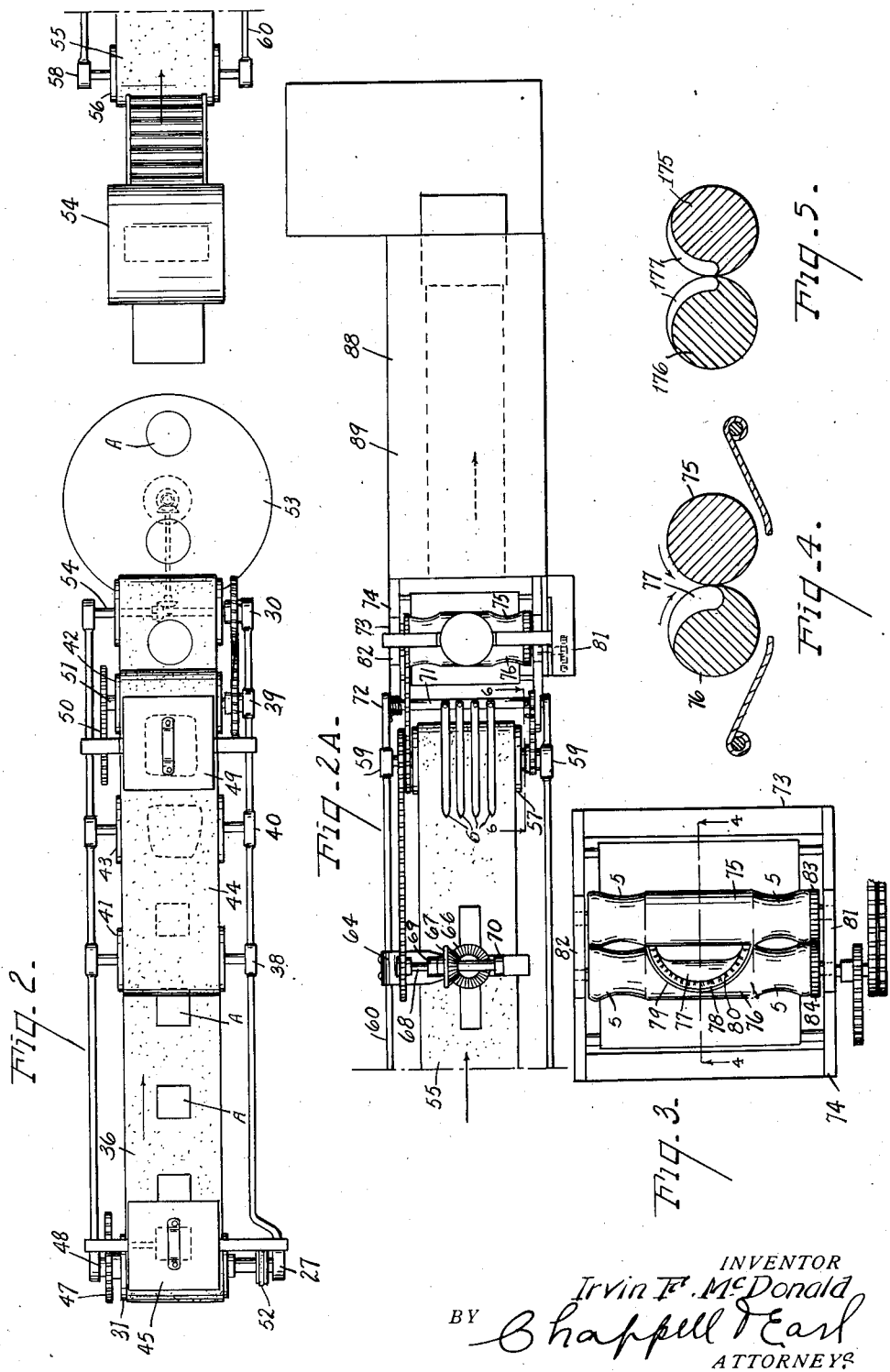

Patented Nov. 27, 1934

1,981,875

UNITED STATES PATENT OFFICE 1,981,875

COOKING MACHINE

Irvin F. McDonald, Los Angeles, Calif.

Application January 18, 1932, Serial No. 587,328

13 Claims. (Cl. 107—4)

This invention relates primarily to a cooking machine for cooking pies, turnovers, folded pies, and similar pastries, either by frying in grease or baking in an oven, and it has for its prime object the provision of a machine of that character which will be practically automatic, from the mixing of the dough to the cooking of the finished product; that is, the dough will be cut, rolled into the proper thickness, the filling deposited therein, and, in the case of turnovers and folded pies, the crust folded over and crimped and trimmed into shape, and in the case of a two-crust pie, the top crust positioned and the edges crimped and trimmed to shape, thus avoiding the major portion of the handling necessary in producing pies with the present method.

Another object is to provide mechanism of the above character which will be simple in construction and efficient in operation, and which can be operated without the need of special knowledge or training.

A still further object is to provide mechanism in a device of the above character for mechanically cutting the crust into shape.

Another object is to provide mechanism in a cooking machine, whereby, in the case of pastries baked or cooked in grease, the product is conveyed therethrough and entirely immersed therein, the length of time during which the same is being conveyed through and immersed in the grease being governed or regulatable, so that the entire product is cooked evenly and thoroughly, resulting in a greatly enhanced appearance, as well as materially reducing the cost to the consumer.

Another object is to provide in a device of the above character suitable means for manually or mechanically cutting the crusts into shape.

Another object is to provide in a machine of the above character means for folding the crust in any desired or convenient manner, regardless of whether the same is folded automatically or manually, or operated mechanically or manually.

Other objects and advantages will appear hereinafter, and while I have shown and will describe the preferred form of my invention, I wish it to be specifically understood that I do not limit myself to such preferred form, but that various changes and adaptations may be made therein without departing from the spirit of my invention.

In the drawings accompanying and forming a part hereof:

Figs. 1 and 1a represent a side elevation of a machine embodying the features of my invention ready for operation.

Figs. 2 and 2a are a top plan of Figs. 1 and 1a.

Fig. 3 is a top plan of the rollers.

Fig. 4 is a section on a line 4—4 of Fig. 3.

Fig. 5 is a section of a modification of the rollers.

Fig. 6 is a fragmentary detail of the dough-transfer mechanism in section on a line corresponding to line 6—6 of Fig. 2a.

Referring to the drawings, 25 indicates supporting standards or brackets, the lower ends of which are secured to, or rest upon the floor 26 and mounted upon the upper ends of these standards, are bearings 27, 28, 29 and 30, and revolvably mounted at their ends in these bearings are the conveyer rollers 31, 32, 33 and 34, which rollers support a conveyer belt 35 of any desired or suitable construction adapted for the purpose. A canvas belt 36 extends around the outer face of the belt 35. Extending upwardly from the brackets 25, near one end thereof, and integral therewith are brackets 37, which act as supports for bearings 38, 39 and 40. Revolvably mounted in the end of bearings 39 and 40 are rollers 41 and 42 and revolvably mounted in the bearing 40 is a roller 43 of a larger diameter than the rollers 41 and 42, so that the conveyer belt 44, supported by said rollers, will be depressed at the central portion of its lowest surface, so as to reduce the space between the belts 35 and 44 for a purpose hereafter explained.

Supported above one end of the belt 37 is a flour sifter 45, operatively connected by a chain 46 to a sprocket 47, rigidly mounted on the end of shaft 48 of the roller 31, whereby said roller and flour sifter rotate in unison.

Supported above the belt 44, at one end thereof, is a similar flour sifter 49, operatively connected by a chain 50 and suitable sprockets to a supporting shaft 51 of roller 42, whereby said roller and sifter rotate in unison. Shaft 48 is operatively connected to a suitable prime mover 2 by means of a belt 52, whereby belts 44 and 36 travel in unison and synchronously. Rotatably mounted in front of, and just beneath, roller 34 is an overflow table 53, operated by suitable means from the shaft 54 of roller 34, whereby said table is rotated in unison with the belt 35. Positioned at the right hand end of table 53 is a crust roller 54 of any of the various types now in use, and extending from the right hand or outlet end of said crust roller is a conveyer belt 55, movably supported at its ends by rollers 56 and 57.

Rollers 56 and 57 are rotatably mounted in bearings 58 and 59 integral with the upper ends of frame 60. Rollers 56 and 57 are suitably connected to a prime mover 3 for rotation thereby. Supported above the belt 55, near the right hand or delivery end thereof, to rotate around a vertical plane is a brushing member 61, provided with a plurality of downwardly depending bristles, the lower ends of which terminate at the belt 55 so as to brush the excess flour from the crust, as it passes thereunder. Member 61 is rigidly mounted upon the lower end of shaft 62, which shaft is rotatably mounted at its upper end in a bearing 63, provided on the end of bracket 64. Bracket 64 extends upwardly from one side of the frame 60. Rigidly mounted upon the upper end of shaft 62, immediately above the bearing 63 is a beveled gear 66 in operative engagement with a similar gear 67, rigidly mounted upon the inner end of shaft 68. Shaft 68 is rotatably mounted in bearings 69 and 70, integral with bracket 64. Mounted at the right hand end of frame 60, just above the roller 57, is a pick-off member 4 adapted for transferring the pie crust from the conveyer 55 to the crust folder 73. This pick-off member comprises a shaft 71 rockably mounted at its ends in bearings 72.

The folding device 73 comprises a rectangular frame 74, and rotatably mounted at their ends in the side walls of this frame to extend therebetween are the folding and crimping rollers 75 and 76. One of the rollers 76 has the medial portion thereof cut away at 77, (as best shown in Fig. 4) in the shape that the pie will assume when folded, and around the edges of this cut away portion 77 is provided a metallic strip 78 provided with crimping teeth at 80, and provided around the edge of this metallic strip 78 is a cutting or trimming member 79. Suitable recesses 5 may be provided in the ends of the roller 75 at the outer sides of the cutting strip 79 for the passage of the trimmings cut off by the said cutting strip.

It will, of course, be obvious that if desired or found advisable, rollers may be used in which this cut away portion, with the cutting and trimming members, is positioned on opposite sides so as to double the capacity thereof, or this cut away portion may be divided equally at 177, 177 between the two rollers, as shown in Fig. 5 and that the rollers may be arranged to oscillate and rock instead of rotating.

Rollers 75 and 76 are revolvably mounted in bearings 81 and 82 provided in the side walls of frame 74, and the adjacent ends of the shafts thereof are connected by spur gears 83 and 84 so as to be rotatable in unison. Frame 74 is rigidly mounted upon a suitable supporting frame 85, and suspended above said frame in any suitable or desired manner is a filling dispenser 86 adapted for dispensing the filling upon the pie crust positioned upon the folder before the same is folded.

Dispenser 86 may be of any of the commonly known types operated in any suitable manner to dispense a predetermined proportion of filling at a time, and is arranged to operate synchronously with the folding device, so that the filling will be dispensed at the proper time and in the proper amount. A conveyer 87 extends beneath the folding device 73 to receive the completed product as it passes through the folder, conveying the same to the cooker 88. This cooker comprising a substantially rectangular pan 89, the material being carried from the folding device 73 to the cooker 88 and completely submerged (it being understood that the pan 89 is filled with hot grease), from whence it is conveyed to any desired place of use or storage.

It will be understood, of course, that suitable means will be provided for conveying the completed product through the hot grease, preferably in a wire or other reticulated container of a shape corresponding to the shape of the completed product, so as to hold the same to its proper shape until sufficiently cooked, these baskets or containers being suitably mounted upon a suitable pan or the like and the completed product may be deposited therein manually or mechanically as desired or found best suited for the purpose.

In the operation of my cooker, the parts will normally be in the positions shown, with a supply of flour in the flour sifters 45 and 49, and a supply of filling in the filling dispenser 86. Power will be supplied to cause the conveyers 36 and 44 to travel in the direction of the arrow (it being understood that the flour sifters will be operated synchronously with the rollers so as to deposit a thin layer of flour thereupon).

The dough, having been previously mixed, will be deposited upon the forward or left end of the conveyer 36 in suitably sized pieces or lumps, properly spaced (as best shown at A in Fig. 1). As the portions of dough are advanced by the conveyer 36, they pass between the same and the conveyer 41 and as the roller 43 is of larger diameter than the rollers 44 and 39, the conveyer 44 will gradually approach conveyer 36 so that as the dough passes beneath roller 43, the same will be squeezed or flattened into a uniform thickness. As the portions pass from between the conveyers 36 and 44, they are deposited upon the rotary table 53, from whence they are taken by the operator and fed manually through the crust roller 54.

While I have shown and described the dough portions as passing from the conveyers onto the rotary table, from whence they are taken by the operator and fed manually through the crust roller, it will be understood and obvious that this manual operation may be omitted and the dough portions caused to be automatically fed into the crust roller.

As the rolled crust passes through the crust roller it is rolled to its proper thickness and is deposited upon the conveyer 55 and is conveyed beneath the rotating brush 61, where the surplus flour is removed therefrom, the same being brushed to one side of the machine, where it is deposited in a suitable container (not shown). These rolled crust portions are then transferred by pick-up member 4 onto the folder 73. This pick-up member comprises a plurality of fingers 6, which are so positioned above the end of the belt 55 that the crust will slide thereupon and suitable mechanism is provided and properly timed, so that when the crust is properly positioned upon the fingers, the same is flopped over and the crust deposited upon the top of the rollers 75 and 76 of the folder 73. The pickup member 4 is oscillated by means of the return spring 140 and the belt 141 which carries a finger 142 engageable with the pin 143 on the shaft of the pick-up member to advance the latter through a forward half turn. Folder 73 will be operating continuously and in unison with the pick-up member 71, and the filling dispenser 86, so that as a crust portion is deposited upon the folder 73, the filling dispenser 86 is operated to deposit the proper amount of filling on the crust at the same time that the folder is being operated to fold the crust. As the folder operates, the completed pie is passed through the aperture 77 between said rollers and deposited upon the conveyer 87.

The folded pies in their uncooked state are then deposited in baskets (not shown) and these baskets being supported upon a suitable support, the basket and its contents are conveyed through the cooker. These baskets are formed in the shape of the folded pie, the cover portion being hinged to one end of the basket portion. This basket portion is of a shape to correspond with the shape of the folded pie, so that when the cover portion is moved to close the open end of the basket, the uncooked pie will be securely held in its folded shape and prevented from being accidentaly distorted.

The folding of the crust in this machine is as shown and described. However, it being practically impossible to show and describe all of the methods and means which might be used for producing this result, I have merely shown what I consider the most practical form.

Having described my invention, what I claim is:

1. In a turnover pie forming machine, the combination of a pair of coacting rolls, one of said rolls having a cavity in the shape of the body of the finished product, a metallic strip surrounding said cavity and having crimping teeth, a cutting member around the outside of said crimping strip, said rolls having opposed annular recesses for the accommodation of the trimmings cut by said cutting member, means acting to invert and place a dough blank in the flat on said rolls, means acting to deposit a quantity of filling material on said dough blank while in the flat, and means acting to rotate said rolls in unison, whereby they act to draw the center of the blank downwardly between them causing the sides of the blank to be folded around the filling material and the edges to be overlapped, sealed, crimped together and trimmed, the finished turnover pie being discharged downwardly from between the rolls.

2. In a turnover pie forming machine, the combination of a pair of coacting rolls having a cavity in the shape of the body of the finished product, a strip surrounding said cavity and having crimping teeth, a cutting member around the outside of said crimping strip, said rolls having opposed recesses for the accommodation of the trimmings cut by said cutting member, means acting to place a dough blank in the flat on said rolls, means acting to deposit a quantity of filling material on said dough blank while in the flat, and means acting to rotate said rolls in unison, whereby they act to draw the center of the blank downwardly between them causing the sides of the blank to be folded around the filling material and the edges to be overlapped, sealed, crimped together and trimmed, the finished turnover pie being discharged downwardly from between the rolls.

3. In a turnover pie forming machine, the combination of a pair of coacting rolls having a cavity in the shape of the body of the finished product, a strip surrounding said cavity and having crimping teeth, a cutting member around the outside of said crimping strip, means acting to place a dough blank in the flat on said rolls, means acting to deposit a quantity of filling material on said dough blank while in the flat, and means acting to rotate said rolls in unison, whereby they act to draw the center of the blank downwardly between them causing the sides of the blank to be folded around the filling material and the edges to be overlapped, sealed, crimped together and trimmed, the finished turnover pie being discharged downwardly from between the rolls.

4. In a turnover pie forming machine, the combination of a pair of coacting rolls having a cavity in the shape of the body of the finished product, a strip surrounding said cavity and having crimping teeth, a cutting member around the outside of said crimping strip, means acting to deposit a quantity of filling material on said dough blank while in the flat on said rolls, and means acting to rotate said rolls in unison, whereby they act to draw the center of the blank downwardly between them causing the sides of the blank to be folded around the filling material and the edges to be overlapped, sealed, crimped together and trimmed, the finished turnover pie being discharged downwardly from between the rolls.

5. In a turnover pie forming machine, the combination of a pair of coacting rolls having a cavity in the shape of the body of the finished product, a sealing strip surrounding said cavity, a cutting member around the outside of said crimping strip, means acting to deposit a quantity of filling material on said dough blank while in the flat on said rolls, and means acting to rotate said rolls in unison, whereby they act to draw the center of the blank downwardly between them causing the sides of the blank to be folded around the filling material and the edges to be overlapped, sealed and trimmed, the finished turnover pie being discharged downwardly from between the rolls.

6. In a turnover pie forming machine, means for depositing filling on a blank of dough, and rollers for folding the dough and provided with means for crimping and trimming the abutting edges thereof substantially as described.

7. In a turnover pie forming device of the character described, the combination of a conveyor for delivering the blanks of dough to a station, means at said station for depositing a filling on each blank, and means at said station for folding the dough blanks to enclose the filling and to trim and crimp the abutting edges.

8. In a turnover pie forming machine, a pair of rollers mounted to rotate in unison, one of said rollers having an opening therein to correspond to the shape of the product after being folded on itself and having means to trim, crimp and seal the edges of the crust together in overlapping relation.

9. In a turnover pie forming device of the character described, the combination of means for depositing pie filling on blanks of dough, rollers for folding the dough to enclose the filling, and means associated therewith for crimping and cutting the overlapping edges of said dough.

10. In a turnover pie forming device of the character described, the combination of a conveyor for delivering the blanks of dough to a station, means at said station for depositing a filling on each blank, means for folding the dough to enclose the filling, and means to trim and crimp the abutting edges of the dough.

11. Apparatus for manufacturing turnovers and the like, comprising means for feeding a portion of dough to a station, means for depositing a quantity of filling on said dough while in the flat at said station, means for folding said dough upon itself directly from the flat to enclose the filling, and means for trimming, pressing and securing the free ends of the dough together to seal the filling therein.

12. Apparatus for manufacturing turnovers and the like, comprising in combination feeding means for delivering a portion of dough to a station, means at said station for folding said dough back on itself, means at said station for depositing a filling on said dough before folding, and means associated with said folding means for trimming, pressing and securing the free edges of the dough together.

13. In a turnover pie forming machine, a pair of rollers mounted to rotate in unison, said rollers having an opening therein to correspond to the shape of the product after being folded on itself and having means to trim, crimp and seal the edges of the crust together in overlapping relation.

IRVIN F. McDONALD.